(12) United States Patent
Lin (10) Patent No.: US 10,925,118 B1
(45) Date of Patent: Feb. 16, 2021

(54) INTELLIGENT INDUSTRIAL INTERNET OF THINGS SYSTEM USING TWO-WAY CHANNEL ARTIFICIAL NEURAL NETWORK

(71) Applicant: Kun Lung Lin, Taipei (TW)

(72) Inventor: Kun Lung Lin, Taipei (TW)

(73) Assignee: ICanControl Tech Co., Ltd, Taipei (TW)

( * ) Notice: Subject to any disclaimer, the term of this patent is extended or adjusted under 35 U.S.C. 154(b) by 0 days.

(21) Appl. No.: 16/553,180

(22) Filed: Aug. 28, 2019

(51) Int. Cl.
*H04W 4/80* (2018.01)
*H04W 88/16* (2009.01)
*G06F 16/28* (2019.01)
*G06N 20/00* (2019.01)
*H04W 72/04* (2009.01)
*H04W 84/18* (2009.01)
*H04L 12/24* (2006.01)

(52) U.S. Cl.
CPC .......... *H04W 88/16* (2013.01); *G06F 16/287* (2019.01); *G06N 20/00* (2019.01); *H04L 41/16* (2013.01); *H04W 4/80* (2018.02); *H04W 72/0453* (2013.01); *H04W 84/18* (2013.01)

(58) Field of Classification Search
CPC ....... H04L 69/26; H04L 41/145; H04L 63/20; H04L 41/5025; H04L 67/125; G06F 12/1408; G01F 1/66; G01S 13/06; G05B 19/048
See application file for complete search history.

(56) References Cited

U.S. PATENT DOCUMENTS

| | | | |
|---|---|---|---|
| 10,031,500 B1 * | 7/2018 | Diaz | G05B 19/41855 |
| 10,530,748 B2 * | 1/2020 | Rotvold | H04L 63/0209 |
| 10,619,760 B2 * | 4/2020 | Anderson | F16K 37/0083 |
| 2017/0192414 A1 * | 7/2017 | Mukkamala | H04L 63/0823 |
| 2017/0347223 A1 * | 11/2017 | Robba | G06F 21/445 |
| 2018/0107230 A1 * | 4/2018 | Sai | G01S 13/347 |
| 2018/0109538 A1 * | 4/2018 | Kumar | H04L 63/08 |
| 2018/0356792 A1 * | 12/2018 | Chao | G05B 19/4185 |
| 2019/0250859 A1 * | 8/2019 | Greene | H04L 67/12 |
| 2019/0281455 A1 * | 9/2019 | Luo | H04W 12/009 |
| 2019/0313164 A1 * | 10/2019 | Bragg | H04L 29/06068 |
| 2020/0142656 A1 * | 5/2020 | Seo | G06F 3/1267 |
| 2020/0186622 A1 * | 6/2020 | Kim | H04L 67/34 |

* cited by examiner

*Primary Examiner* — Syed Ali (57) ABSTRACT

An intelligent IIoT system using two-way channel ANN without gateway, the intelligent IIoT system is connected to sensing devices and motion devices. comprising a PLC with I/O module, communication module, perception database, motion database, edge computing module and the first MQTT data module; a Cloud server with MQTT agent, Big Data module, Human-Cloud visual database and Human-Cloud control database; and a remote device with Human-Cloud visual interface program, Human-Cloud control interface program and the second MQTT data module; and the three components are connected via network; it is unnecessary to construct gateways and network communication equipment, low construction cost, short construction period, easy maintenance, low power consumption, faster communication speed, two-way many-many transmission, stably synchronous real-time processing, and very reliable.

7 Claims, 8 Drawing Sheets

INTELLIGENT INDUSTRIAL INTERNET OF THINGS SYSTEM USING TWO-WAY CHANNEL ARTIFICIAL NEURAL NETWORK

BACKGROUND OF INVENTION

1. Field of the Invention

The present invention relates generally to an intelligent enterprise integrated structure of industry, industrial products and service, and more particularly to an intelligent Industry Internet of Things (IIoT) system using two-way channel artificial neural network (ANN).

2. Description of Related Art

The 4$^{th}$ Industrial Revolution, known as Industry 4.0, is a high-tech program first proposed by the German government, the main spirits are connection and optimization, linking and optimizing the manufacture related elements, so as to enhance the competitiveness and profits of enterprises. At present, Japanese manufacturers' goal for Industry 4.0 aims at "zero downtime and zero supply delay". The German Industry 4.0 aims at "the most customized" elasticity of production with economic batch quantity as 1 at the same cost.

In Industry 4.0, the IIoT is an indispensable part for transformation of Cyber-Physical System and production flow by Big Data and analysis.

The IIoT, i.e. Industry Internet of Things, is the extension and use of IoT (Internet of Thing) in industrial application. The IIoT lays stress on M2M communication, Big Data and Machine learning (ML), making industrial operation more efficient and reliable. The IIoT covers the entire industrial application, including robots, medical facilities and software-defined production flow.

The real-time data from sensors and other data sources can assist industrial equipments and infrastructures in making decisions, proposing opinions and specific actions. The machines can take over and automate the tasks previous Industrial Revolution could not handle. In a wider background, the IIoT is quite important for the network ecosystem or environment related usage scenarios, e.g. how to build cities into intelligent cities or how to transform factories into intelligent factories.

The IIoT exceeds the common consumer device and physical device internetworking of IoT; what makes it different is the intersection of IT and OT. OT refers to the network of operation process and ICS, including HMI, SCADA system, DCS and PLC.

Figure 1:
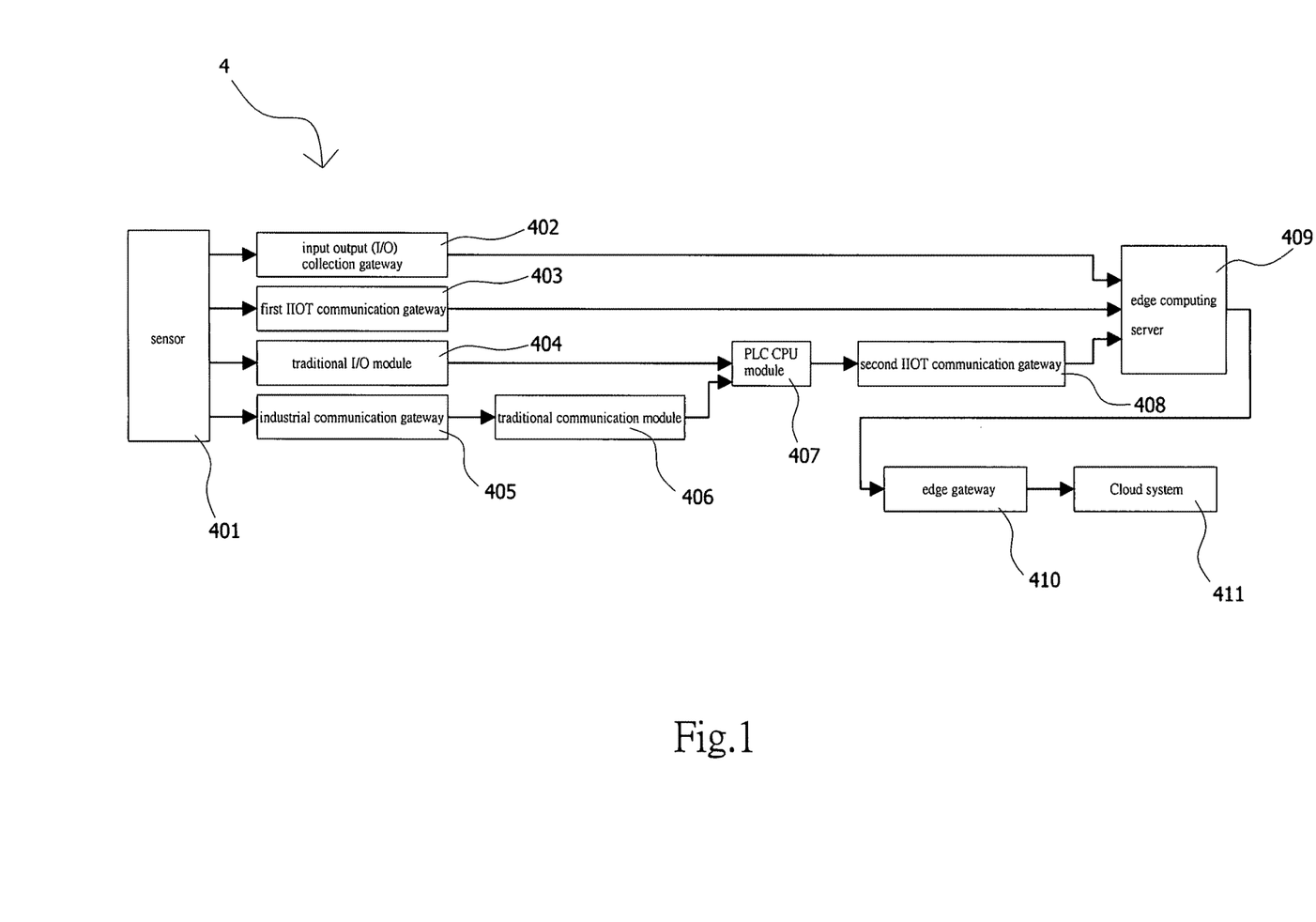
FIG. 1 is a simple structural representation of traditional IIoT communication network.
Figure 2:
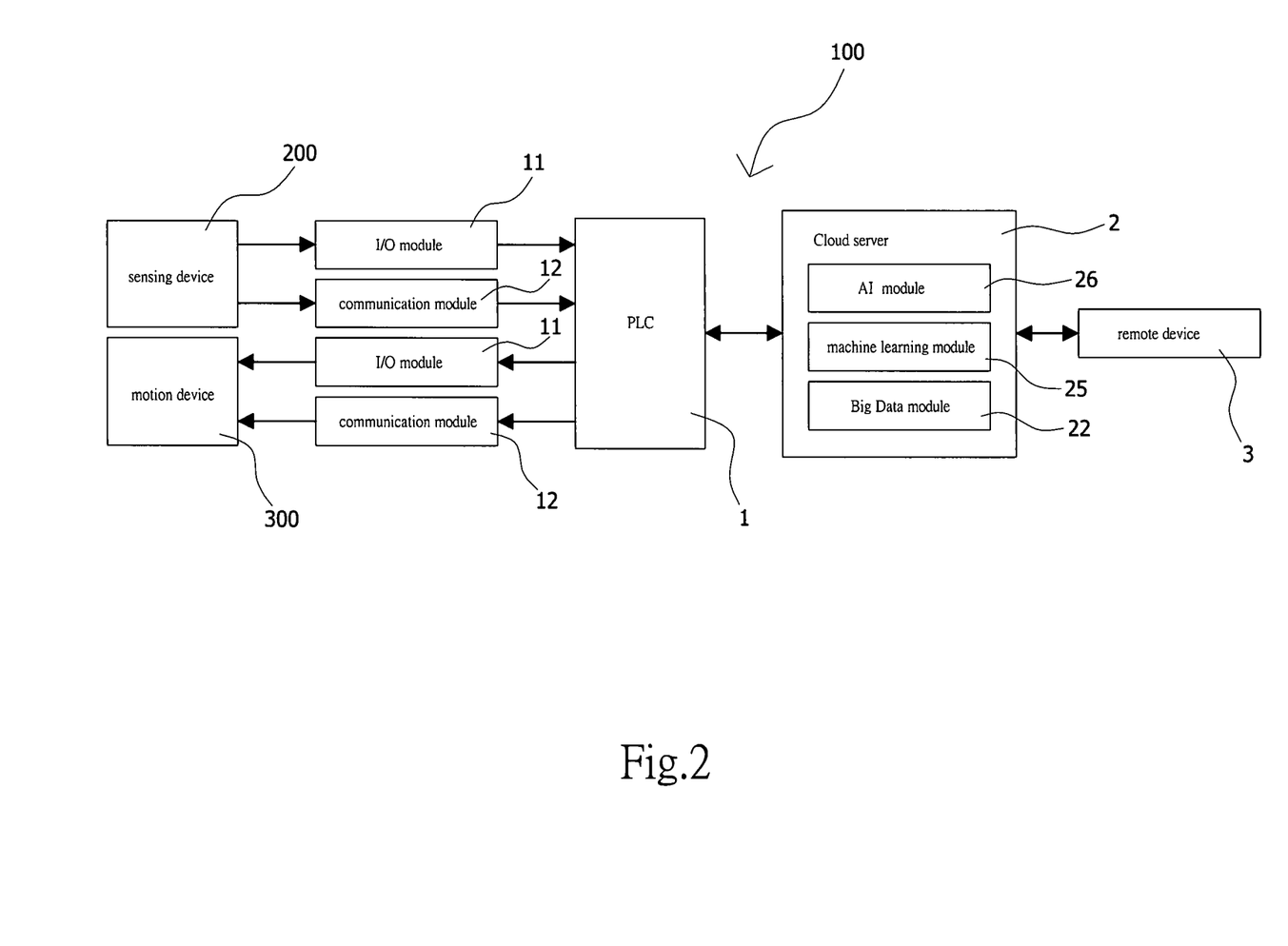
FIG. 2 is a simple structural representation of the present invention.

At present, the main architecture of the practical traditional IIoT communication network architecture 400 is shown in FIG. 1. A sensor 401 will be connected to an input output (I/O) collection gateway 402, a first IIOT communication gateway 403, a traditional I/O module 404 and an industrial communication gateway 405. The I/O collection gateway 402 and the first IIOT communication gateway 403 are connected to an edge computing server 409. The traditional I/O module 404 is connected to a PLC CPU module 407. The industrial communication gateway 405 is connected to a traditional communication module 406. The traditional communication module 406 is connected to the PLC CPU module 407. The PLC CPU module 407 is connected to a second IIOT communication gateway 408. The second IIOT communication gateway 408 is connected to the edge computing server 409. The edge computing server 409 is connected to an edge gateway 410. Finally, the edge gateway 410 is connected to a Cloud system 411.

The approximate architecture of traditional IIoT communication network architecture 400 can be known from the above description, the problem is the edge gateway 410, the gateway hardware construction cost is high, and not disclosed in the above description and figures, but in the use of gateway, network communication equipments are required to assist the gateway with communication linkage. The network communication equipments have a high construction cost, and the repeated network layout further increases the construction cost and prolongs the construction period. After the construction is completed, the maintenance management is relatively difficult, leading to high maintenance and labor costs. As the gateway and network communication equipments consume high electric energy, the operating cost is increased, and the operation is not friendly to the environment.

The major problem is that in the use of gateway, the network packet transmission rate is reduced, so that the communication speed is slow, and the network packet transmission direction is restricted, only unidirectional one-to-one transmission is available, and the network packet transmitted data are easy to be lost, failing reliable synchronous real-time processing.

In view of this, how to provide an intelligent IIoT system using two-way channel ANN which can solve the aforethe problems becomes the topic to be improved by the present invention.

SUMMARY OF THE INVENTION

The purpose of the present invention is to overcome the deficiencies in the existing technology to provide an explosion proof lamp which is easy to be repaired and maintained.

In order to solve the above problems, the technical scheme of the present invention is described below:

An intelligent industry internet of things (IIoT) system using two-way channel artificial neural network (ANN), the IIoT system (100) being connected to at least a sensing device and at least a motion device, comprising:

wherein the IIoT system includes at least a programmable logic controller (PLC), at least a Cloud server and at least a remote device;

wherein the PLC has at least an input output (I/O) module, at least a communication module, a perception database, a motion database, an edge computing module and a first message queuing telemetry transport (MQTT) data module; the I/O module and the communication module are connected to the sensing device and the motion device respectively; the perception database and the motion database are connected to the I/O module and the communication module respectively; the edge computing module is connected to the perception database and the motion database respectively; the first MQTT data module is connected to the edge computing module, and connected to the Cloud server via network;

wherein the Cloud server is connected to the PLC via network, and at least has a MQTT agent, a Big Data module, a Human-Cloud visual database and a Human-Cloud control database; the MQTT agent is connected to the first MQTT data module via network; the Big Data module is connected to the MQTT agent; the Human-Cloud visual database and the Human-Cloud control database are connected to the MQTT agent and the Big Data module respectively, and connected to the remote device via network;

wherein the remote device is connected to the Cloud server via network, and it at least has a Human-Cloud visual interface program, a Human-Cloud control interface program and a second MQTT data module; the Human-Cloud visual interface program and the Human-Cloud control interface program are connected to the second MQTT data module respectively; the second MQTT data module is to connected to the MQTT agent via network, and simultaneously connected to the Human-Cloud visual database and Human-Cloud control database via the MQTT agent.

More particularly, wherein the edge computing module includes an edge computing program and an edge computing database the edge computing program is connected to the perception database and the motion database respectively; the edge computing database is connected to the edge computing program and the first MQTT data module respectively;

wherein the first MQTT data module includes a first conversion program, a first MQTT database, a first subscription program and a first issue program; the first conversion program is connected to the edge computing database; the first MQTT database is connected to the first conversion program; the first subscription program is connected to the first MQTT database and the MQTT agent respectively; the first issue program is connected to the first MQTT database and the MQTT agent respectively;

wherein the Big Data module includes a Big Data operation program and a Big Data database; the Big Data operation program is connected to the MQTT agent and the Big Data database; the Big Data database is connected to the Human-Cloud visual database and the Human-Cloud control database respectively;

wherein the second MQTT data module includes a second conversion program, a second MQTT database, a second subscription program and a second issue program; the second conversion program is connected to the Human-Cloud visual interface program and the Human-Cloud control interface program respectively; the second MQTT database is connected to the second conversion program, the second subscription program and the second issue program respectively; the second subscription program is connected to the MQTT agent; the second issue program is connected to the MQTT agent.

More particularly, the Cloud server has at least one of machine learning module and AI module which can be connected to the Big Data module.

More particularly, wherein the machine learning module includes a machine learning analysis operation program and a machine learning database; the machine learning analysis operation program is connected to the Big Data database; the machine learning database is connected to the machine learning analysis operation program, the Human-Cloud visual database and the Human-Cloud control database respectively;

wherein the AI module includes an AI decision-making operation program and an AI database; the AI decision-making operation program is connected to the Big Data database; the AI database is connected to the AI decision-making operation program, the Human-Cloud visual database and the Human-Cloud control database.

More particularly, wherein when the Cloud server has the machine learning module and the AI module simultaneously, the AI decision-making operation program is connected to the machine learning database, and connected to the Big Data database via the machine learning analysis operation program connected to it.

More particularly, wherein the communication protocol applied among the PLC, the Cloud server and the remote device is MQTT communication protocol.

More particularly, wherein the remote device is a pair of smart glasses.

In comparison to the existing technology, the present invention has the following benefits:

1. The present invention, intelligent IIoT system, coordinates PLC, Cloud server and remote device to implement the effect of Cyber-Physical System, the information technology, operation technology and communication technology must be fused effectively, and combined with open data platform to form an intelligent enterprise integrated structure, so as to link Cloud and data analysis application, striding toward the kernel object of Industry 4.0 effectively. In comparison to traditional IIoT communication network architecture, it is unnecessary to build gateway hardware and the network communication equipments assisting gateway hardware communication linkage, or to repeat network layout, the construction cost is saved to some extent, the construction period can be shortened, meanwhile the difficulty in maintenance management is reduced, and the maintenance and labor costs are reduced. Moreover, the electric energy consumption can be reduced, the operating cost is reduced, and the environment is protected. Above all, the communication is faster, two-way many-many transmission and stably synchronous real-time processing are implemented, and very reliable.

2. The intelligent IIoT system of the present invention uses the concept of neural network architecture. The sensing devices refer to different input devices, such as various sensors. The motion devices refer to different output devices, such as relays, oil hydraulic cylinders, cylinders, manipulators, motors, control valve AGV vehicles and conveyors, preventing the failure in collecting adequate data, and the data can be used effectively, and the failure in real-time feedback to the site is solved.

DETAILED DESCRIPTION OF THE INVENTION

According to the figures, the detailed description is given below.

In the attached figures, the same elements or components are represented by the same symbols as possible. In order to avoid confusing the tenor of the present invention, the specification of related recognized functions or composition is omitted.

FIG. 2 to FIG. 5 disclose the Embodiment 1, which is an intelligent industry internet of things (IIoT) system using two-way channel artificial neural network (ANN). The intelligent IIoT system 100 can be connected to at least a sensing device 200 and at least a motion device 300, the feature is that the intelligent IIoT system 100 comprises at least a programmable logic controller (PLC) 1, at least a Cloud server 2 and at least a remote device 3. The PLC 1 comprises at least an I/O module 11, at least a communication module 12, a perception database 13, a motion database 14, an edge computing module 15 and a first message queuing telemetry transport (MQTT) data module 16. The I/O module 11 and the communication module 12 are connected to the sensing device 200 and the motion device 300 respectively. The perception database 13 and the motion database 14 are connected to the I/O module 11 and the communication module 12 respectively. the edge computing module 15 is connected to the perception database 13 and the motion database 14 respectively. The first MQTT data module 16 is connected to the edge computing module 15, and connected to the Cloud server 2 via network 10. The Cloud server 2 is connected to the PLC 1 via network 10, and has at least a MQTT agent 21, a Big Data module 22, a Human-Cloud visual database 23 and a Human-Cloud control database 24. The MQTT agent 21 is connected to the first MQTT data module 16 via network 10. The Big Data module 22 is connected to the MQTT agent 21. The Human-Cloud visual database 23 and the Human-Cloud control database 24 are connected to the MQTT agent 21 and the Big Data module 22 respectively, and connected to the remote device 3 via network 10. The remote device 3 is connected to the Cloud server 2 via network 10, and at least has a Human-Cloud visual interface program 31, a Human-Cloud control interface program 32 and a second MQTT data module 33. The Human-Cloud visual interface program 31 and the Human-Cloud control interface program 32 are connected to the second MQTT data module 33 respectively. The second MQTT data module 33 is connected to the MQTT agent 21 via network 10, and connected to the Human-Cloud visual database 23 and Human-Cloud control database 24 simultaneously via the MQTT agent 21.

As stated above, the PLC 1, Cloud server 2 and remote device 3 compose the intelligent IIoT system 100 of the present invention, compared with the traditional IIoT communication network architecture 400 in FIG. 1, the two-way channel ANN is used, synchronization can be implemented within millisecond-scale time. The gateway in traditional IIoT communication network architecture 400 is replaced by PLC 1, and the network communication equipments for assisting the gateway are removed. Thus, it is unnecessary to repeat network layout, the overall construction cost is reduced, the construction period is shortened, the maintenance and labor costs can be reduced, as the device is simplified, the electric energy consumption will be reduced, it is undoubtedly more friendly to the environment.

Secondly, for the application of PLC 1, the network packet transmission rate is high, the communication speed is higher, and there is no limitation of network packet transmission direction, two-way many-many transmission is available, and there is no network packet transmitted data loss, reliable stable synchronous real-time processing.

Thirdly, the intelligent IIoT system 100 of the present invention is free of four items. It is free of operating system, protecting the system against viruses, exempt from system construction cost and system maintenance update. It is free of graphic control software, exempt from hardware construction cost, system construction cost and software maintenance update, protecting the system against viruses. It is free of gateway, exempt from hardware construction cost, the transmission rate and one-way transmission are improved. It is free of servo architecture, exempt from machine room construction cost, servo construction cost and IT maintenance update. The Cyber-Physical System, fused information, operation and communication technologies positively implement the kernel object of Industry 4.0.

Fourthly, the PLC 1 is applicable to factories, easy setup and maintenance, low failure rate, extensive application area, meanwhile it enables the intelligent IIoT system 100 of the present invention to collect data autonomously, it is unnecessary to worry about insufficient data volume, data loss and data mismatch.

Figure 4:
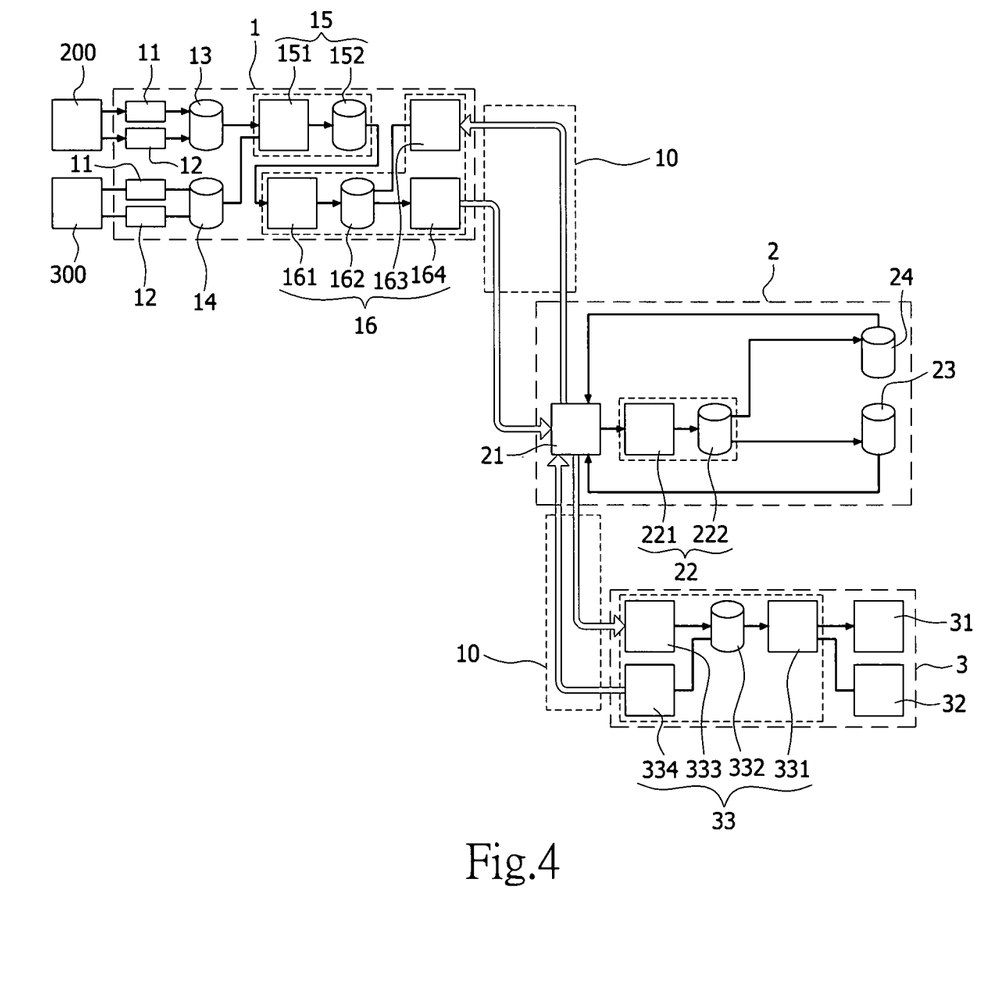
FIG. 4 is a schematic diagram of the architecture implementation for observing sensing device data in Embodiment 1 of the present invention.
Figure 5:
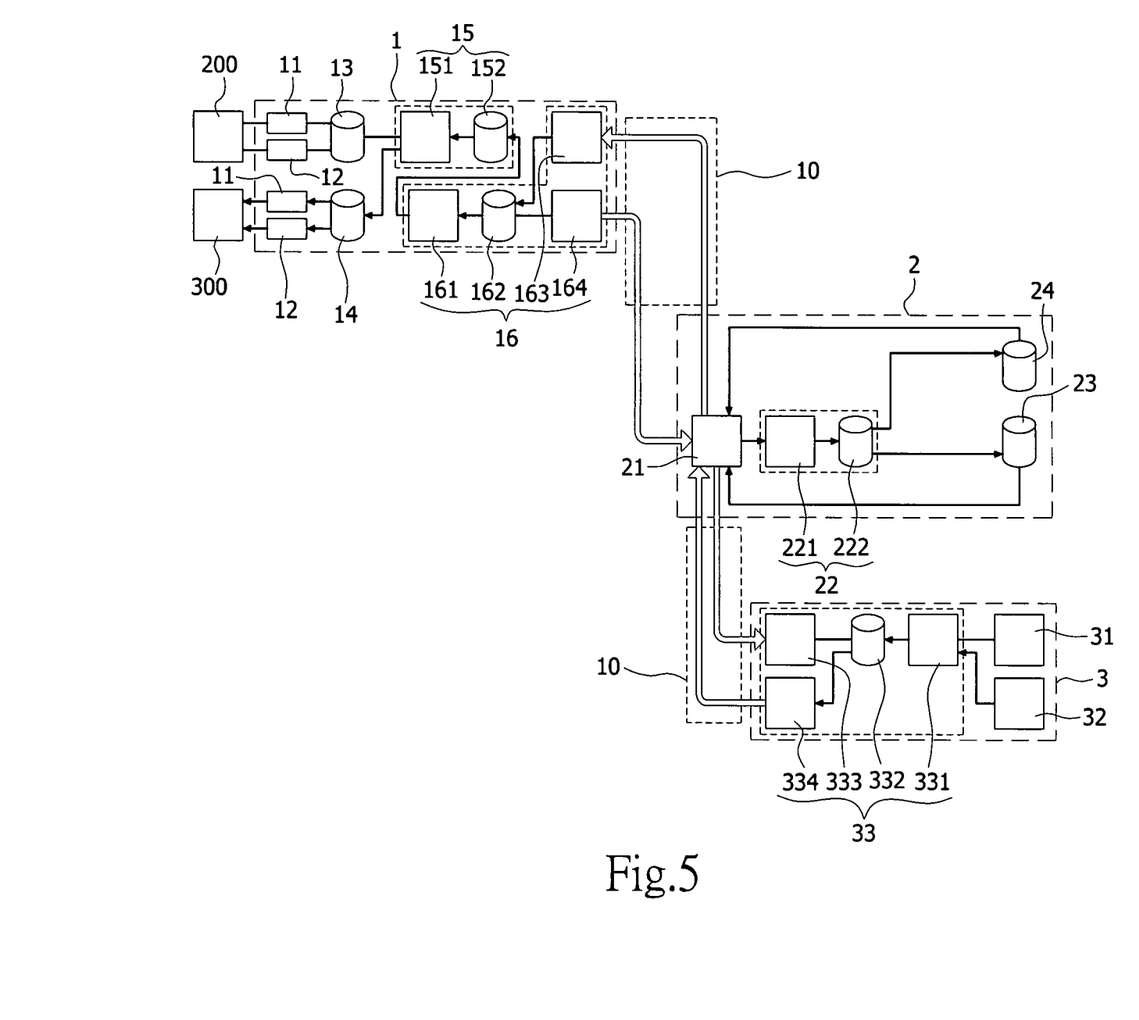
FIG. 5 is a schematic diagram of the architecture implementation for operating motion device in Embodiment 1 of the present invention.

Further, as the two-way channel ANN is used, as shown in FIG. 4, the mass data obtained by PLC 1 using such I/O modules 11 as digital input module, analog input module, temperature measurement module and power measurement module and such communication modules 12 as RS-232 communication module, RS-485 communication module, EtherNet communication module, CANOpen communication module, PROFIBUS communication module, RFID communication module and GPRS communication module from such sensing devices 200 as pressure sensor, temperature humidity sensor, temperature sensor, flow sensor, liquid level sensor, ultrasonic sensor, immersion sensor, illuminance sensor, differential pressure transmitter, acceleration sensor, displacement sensor, weighing sensor and industrial camera can be stored in the perception database 13, with the edge computing module 15 and the first MQTT data module 16, and transmitted to the MQTT agent 21 of Cloud server 2 via network 10 rapidly, after the processing by Big Data module 22 and data mining of Human-Cloud visual database 23, a remote user using a remote device 3 can receive and process the data transferred from the MQTT agent 21 at the second MQTT data module 33 via network 10, and the Human-Cloud visual interface program 31 enables the user to know the present situation instantly in the distance. Due to bilateral synchronization, when the remote user knows the situation, referring to FIG. 5, he can use the Human-Cloud control interface program 32 of remote device 3 to feed back data to the MQTT agent 21 via the second MQTT data module 33, and the data are processed by the Big Data module 22 and Human-Cloud control database 24 and fed back to the first MQTT data module 16, with the edge computing module 15, the data are sent to the motion database 14, and to such motion devices 300 as relay, oil hydraulic cylinder, cylinder, manipulator, motor, control valve AGV vehicle and conveyor via such I/O modules 11 as digital output module, analog output module and pulse output module and such communication modules 12 as RS-232 communication module, RS-485 communication module, EtherNet communication module, CANOpen communication module, PROFIBUS communication module, RFID communication module and GPRS communication module. In the entire process, it is almost real-time processing disregarding the user's reaction and thinking time.

Further, such corresponding industrial communication protocols as RFID, GPRS, TCP/IP, CANOpen, CANBus, EtherCAT, EtherNet/IP, ModBus, ModBus TCP/IP, PROFINET and PROFIBUS can be used according to different communication modules 12 in operation.

In the aforethe content, the network 10 connecting the PLC 1, Cloud server 2 and remote device 3 generally refers to the Internet, implemented in wired and/or wireless mode.

The application instance 1 of intelligent IIoT system 100 of the present invention can be applied to intelligent buildings, to collect and manage the resource information of buildings, including power, lighting, air conditioning, fire control, entrance guard, space, cabinets and information equipments, to optimize the use of resources and increase the building operating efficiency.

The application instance 2 of intelligent IIoT system 100 of the present invention can be used for motor health consultation, the PLC 1 collects data from such sensing device 200 as vibration sensor, with Cloud server 2, the present operating condition and health status of important equipments and key parts can be known, and the remote device 3 can be used to give warning of negative factors in current operating conditions in time and to perform initial failure monitoring, the negative factors in mechanical device operation are reduced, the part life is prolonged effectively, work safety accidents are prevented, the spirit of life prolonging program is implemented, so as to avoid unexpected severe equipment faults resulting in high maintenance cost and operating loss.

The application instance 3 of intelligent IIoT system 100 of the present invention can be applied to intelligent factories, the PLC 1 collects data from the sensing device 200 of air conditioning system, power monitoring system, machine control system, access control system, disaster prevention system, monitoring module and environment system, with Cloud server 2, the user can use remote device 3 to track the KPI selected in the production process instantly anywhere, providing flash warning and notice for appropriate personnel at a proper time, so as to give warning of any messages in operation, and simple virtual controls can interact with key processes everywhere at any time, accelerating field maintenance.

Figure 3:
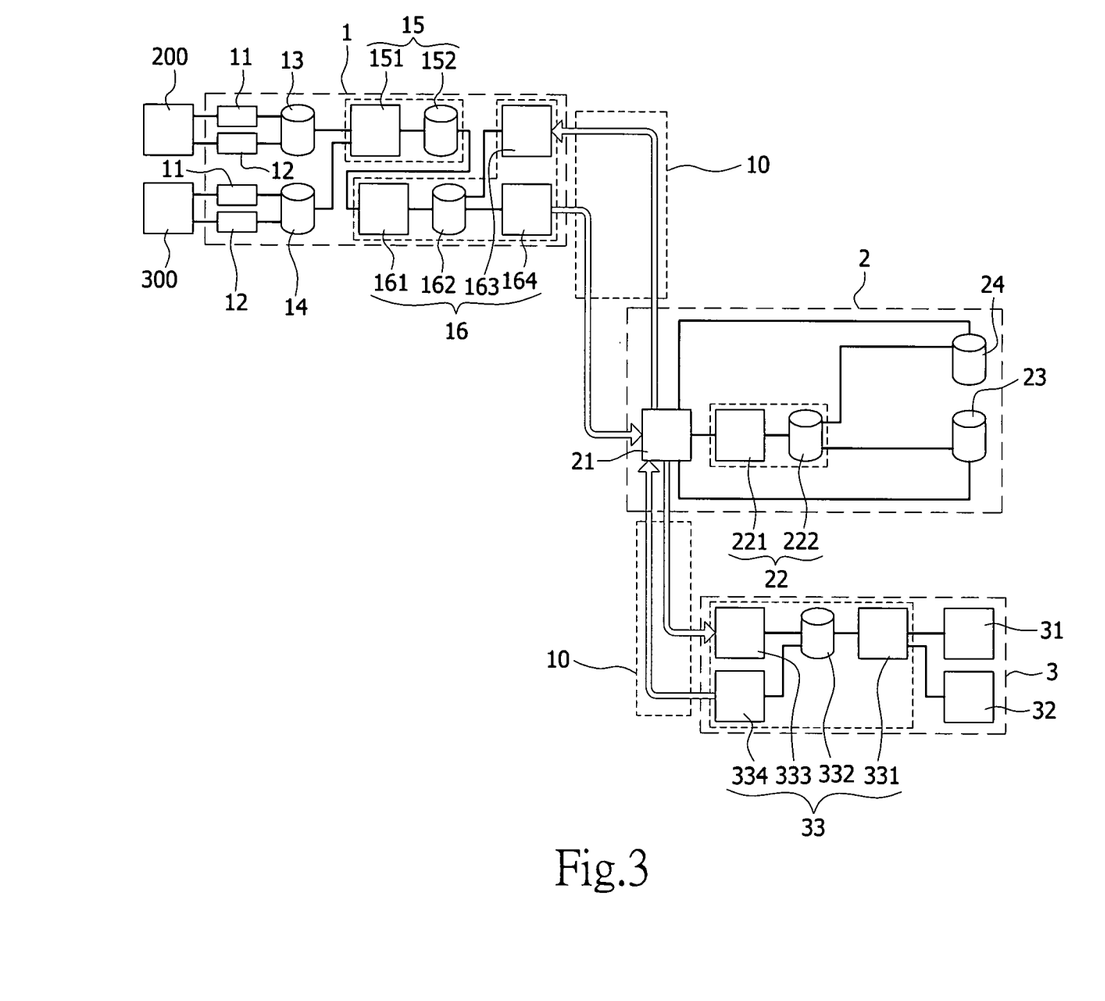
FIG. 3 is a schematic diagram of the overall architecture of Embodiment 1 of the present invention.

Referring to FIG. 3, the edge computing module 15 comprises an edge computing program 151 and an edge computing database 152. The edge computing program 151 is connected to the perception database 13 and the motion database 14 respectively. The edge computing database 152 is connected to the edge computing program 151 and the first MQTT data module 16 respectively. The first MQTT data module 16 comprises a first conversion program 161, a first MQTT database 162, a first subscription program 163 and a first issue program 164. The first conversion program 161 is connected to the edge computing database 152, the first MQTT database 162 is connected to the first conversion program 161, the first subscription program 163 is connected to the first MQTT database 162 and the MQTT agent 21 respectively. The first issue program 164 is connected to the first MQTT database 162 and the MQTT agent 21 respectively. The Big Data module 22 comprises a Big Data operation program 221 and a Big Data database 222. The Big Data operation program 221 is connected to the MQTT agent 21 and the Big Data database 222. The Big Data database 222 is connected to the Human-Cloud visual database 23 and the Human-Cloud control database 24 respectively. The second MQTT data module 33 comprises a second conversion program 331, a second MQTT database 332, a second subscription program 333 and a second issue program 334. The 20 second conversion program 331 is connected to the Human-Cloud visual interface program 31 and the Human-Cloud control interface program 32 respectively. The second MQTT database 332 is connected to the second conversion program 331, the second subscription program 333 and the second issue program 334 respectively. The second subscription program 333 is connected to the MQTT agent 21, and the second issue program 334 is connected to the MQTT agent 21.

Wherein the edge computing program 151 and the edge computing database 152 enable the edge computing module 15 to process information efficiently, the time lag and data transmission/storage cost resulted from handling everything in Cloud is reduced, with the intelligent IIoT system 100 of the present invention, a high-transmission low-latency architecture can be implemented, the Cloud server 2 can work effectively.

Secondly, the first conversion program 161 cooperates with the first MQTT database 162, and the second conversion program 331 cooperates with the second MQTT database 332 to process MQTT data, and the first subscription program 163, the second subscription program 333, the first issue program 164 and the second issue program 334 enable the first MQTT data module 16 and the second MQTT data module 33 to subscribe for and issue operation normally, providing light, reliable and rapid communication without oversize network bandwidth.

Further, the Big Data operation program 221 and the Big Data database 222 make the Big Data module 22 effective, so as to compile and analyze the mass data collected from PLC 1, to improve the operating efficiency of intelligent IIoT system 100 of the present invention continuously, and to reduce the occurrence probability of problems.

Figure 6:
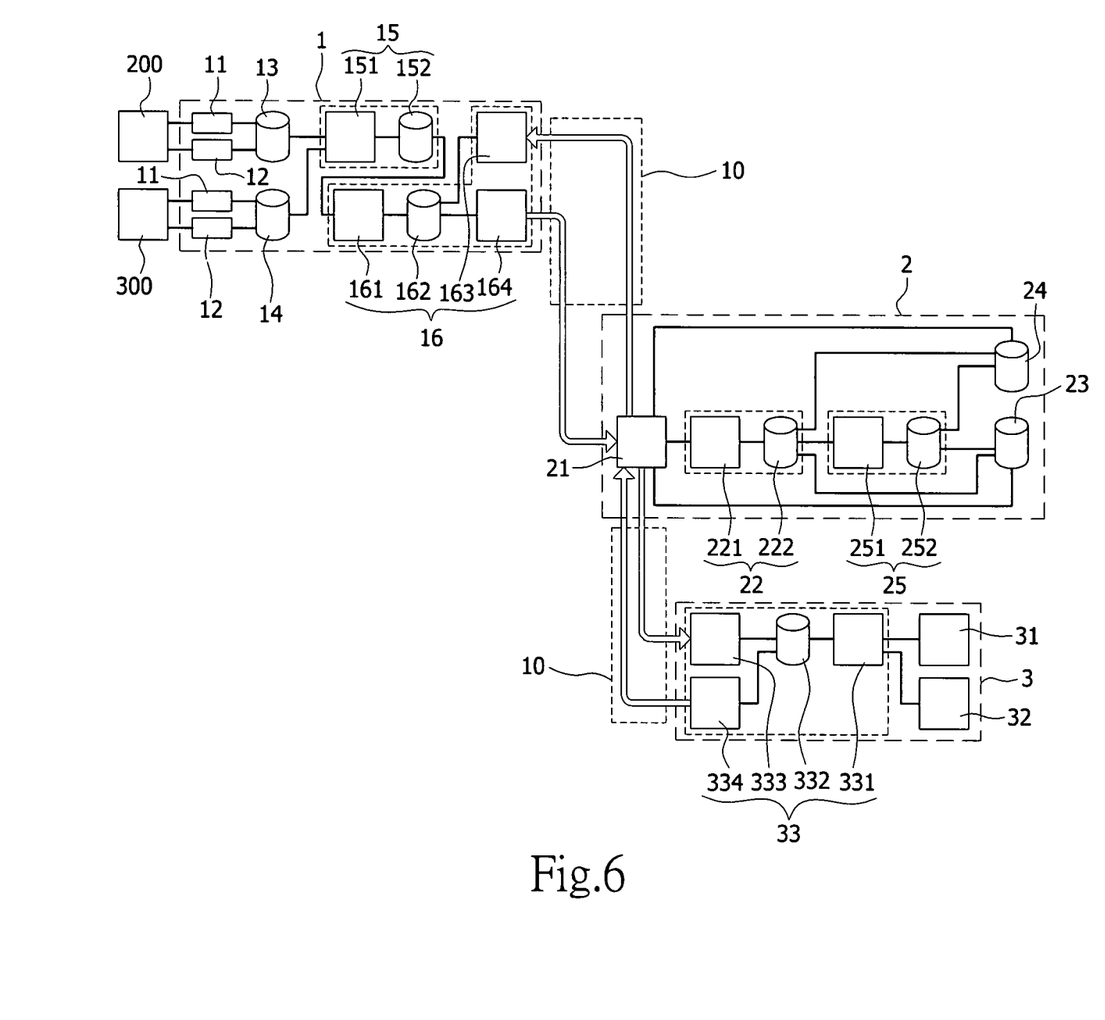
FIG. 6 is a schematic diagram of overall architecture of Embodiment 2 of the present invention.

Referring to FIG. 6 for the second embodiment of the present invention, the Cloud server 2 at least has a machine learning module 25 which can be connected to the Big Data module 22.

The machine learning module 25 comprises a machine learning analysis operation program 251 and a machine learning database 252. The machine learning analysis operation program 251 is connected to the Big Data database 222. The machine learning database 252 is connected to the machine learning analysis operation program 251, the Human-Cloud visual database 23 and the Human-Cloud control database 24 respectively.

Wherein the machine learning module 25 can cooperate with the Big Data module 22, so that the mass data collected from PLC 1 can be used by machine learning module 25. The data are analyzed by machine learning analysis operation program 251 and stored in the machine learning database 252. Complex functions or samples are derived from the data and learned to create an algorithm or a set of rules, so that the machine learns how to predict or reflect the future from the data, the intelligent IIoT system 100 of the present invention can work more intelligently, and can complete data collection automatically, it is unnecessary to be afraid that the machine learning module 25 has no adequate data for learning, the machine learning module 25 can be really effective.

Figure 7:
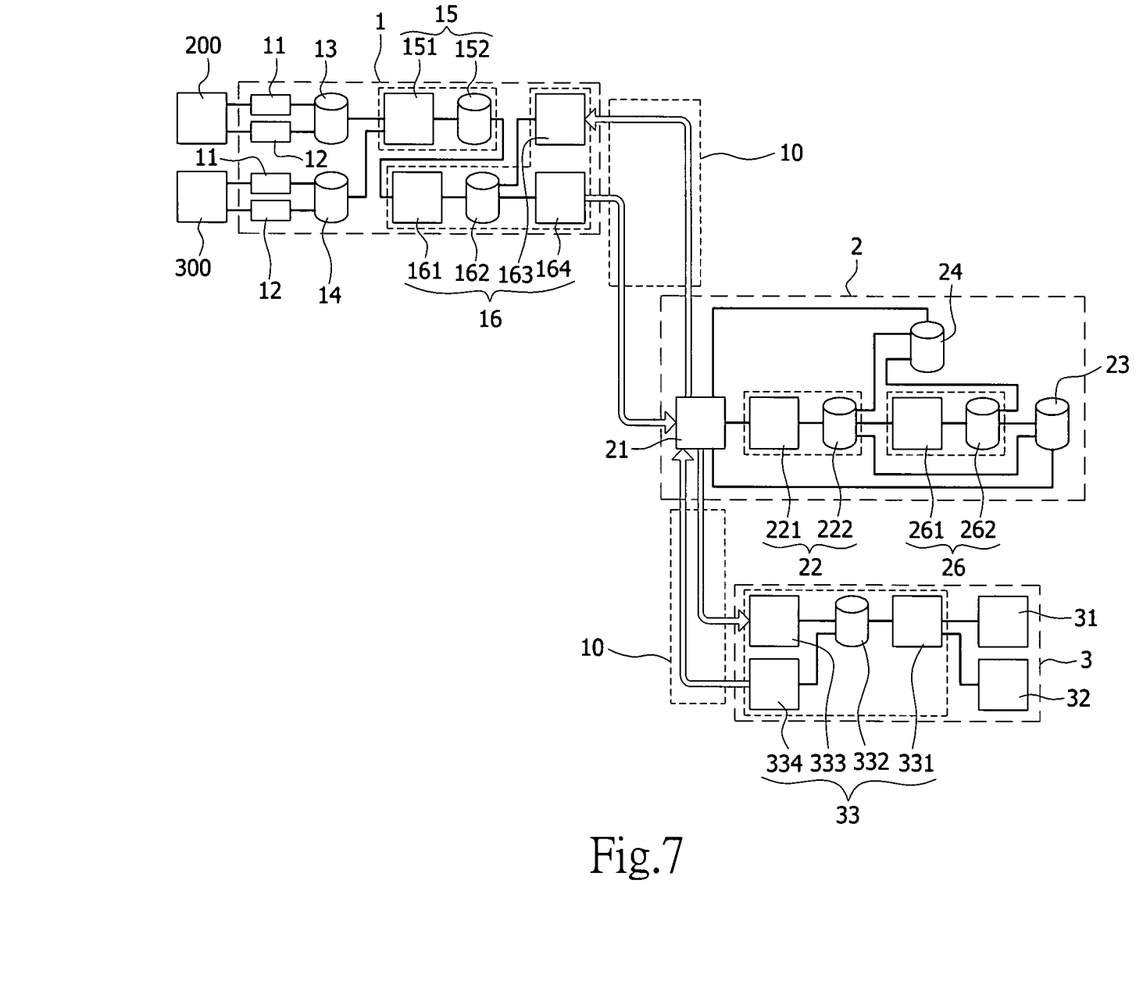
FIG. 7 is a schematic diagram of overall architecture of Embodiment 3 of the present invention.

Referring to FIG. 7 for the third embodiment of the present invention, the Cloud server 2 at least has an AI module 26 which can be connected to the Big Data module 22.

The AI module 26 comprises an AI decision-making operation program 261 and an AI database 262. The AI decision-making operation program 261 is connected to the Big Data database 222. The AI database 262 is connected to the AI decision-making operation program 261, the Human-Cloud visual database 23 and the Human-Cloud control database 24 respectively.

Wherein the AI intelligent module 26 can cooperate with the Big Data module 22, so that the mass data collected from PLC 1 can be used by the AI module 26, the data are analyzed by the AI decision-making operation program 261 and stored in the AI database 262, so that the AI decision-making operation program 261 has adequate data, the decision-making algorithm can work well, the intelligent IIoT system 100 of the present invention can work more intelligently, and can complete data collection automatically, it is unnecessary to be afraid that the deficiency in Knowledge engineering makes the AI module 26 stay on the surface, the AI module 26 can be really effective.

Figure 8:
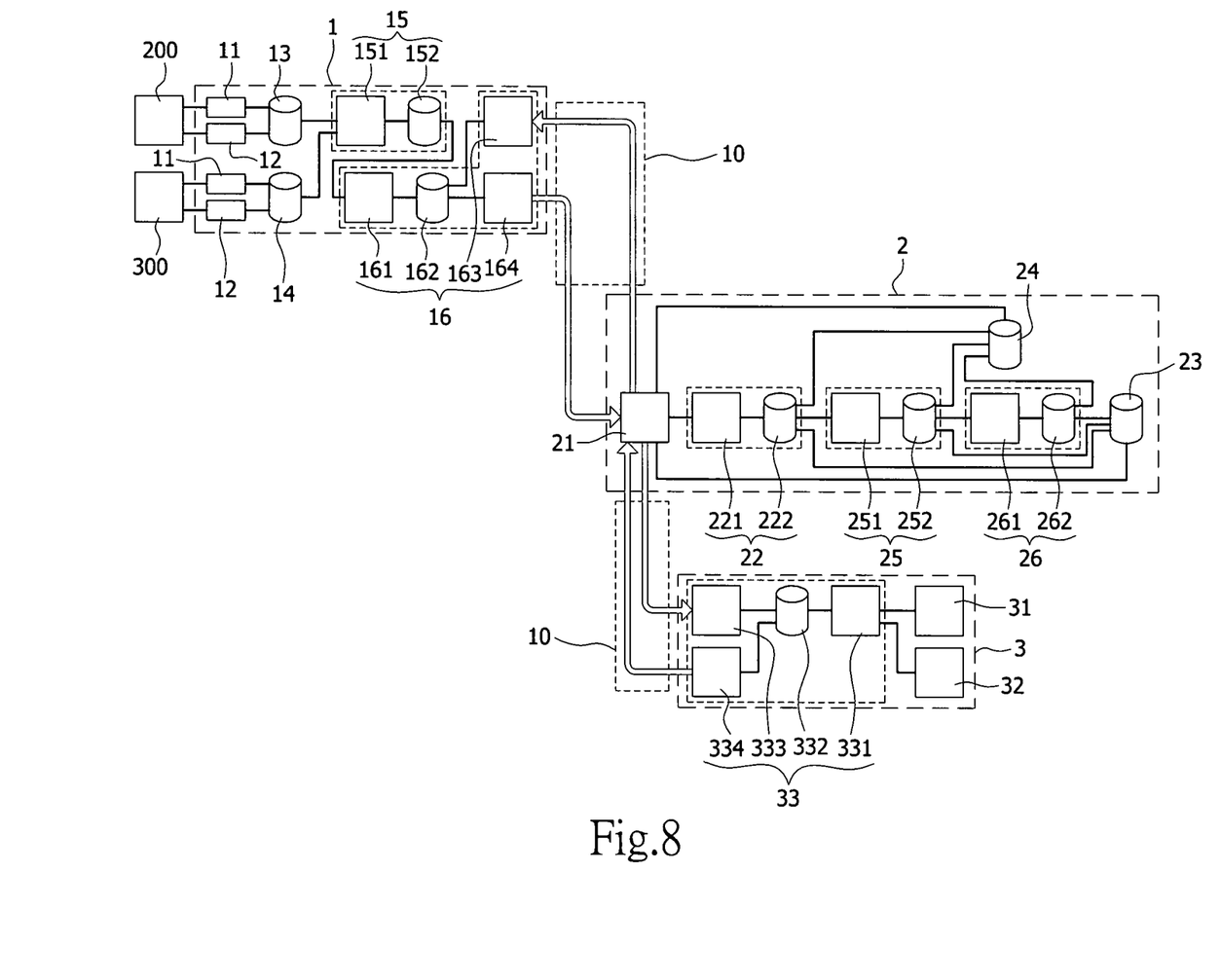
FIG. 8 is a schematic diagram of overall architecture of Embodiment 4 of the present invention.

Referring to FIG. 8 for the fourth embodiment of the present invention, when the Cloud server 2 comprises the machine learning module 25 and the AI module 26 simultaneously, the AI decision-making operation program 261 is connected to the machine learning database 252, so as to connect the Big Data database 222 through the machine learning analysis operation program 251 connected to it.

Wherein the machine learning module 25 and AI module 26 are implemented simultaneously, and the data are collected by PLC 1, so that the intelligent IIoT system 100 of the present invention can work more efficiently and intelligently. The machine learning module 25 and AT module 26 work simultaneously, the intelligent IIoT system 100 of the present invention can cover different application areas, the application area of the present invention is expanded.

In Embodiments 1 to 4 of the present invention, the communication protocol among the PLC 1, Cloud server 2 and remote device 3 is MQTT communication protocol.

Wherein the application of MQTT communication protocol simplifies the message content, it is very suitable for the IoT devices with limited processor resources and network bandwidth, so that the PLC 1, Cloud server 2 and remote device 3 can communicate with each other smoothly.

In Embodiments 1 to 4 of the present invention, the remote device 3 is a pair of smart glasses. The smart glasses facilitate the remote device 3, providing a new information interaction method, it is to unnecessary to worry about inconvenience, the virtual world on the screen can be combined and interactive to the real scenes. Above all, it is very intuitive, the difficulty in the application of the present invention is reduced.

The embodiments are not to limit the scope of patent for the present invention, so any modificatory changes matching the intention of the present invention shall be covered in the scope of patent for the present invention.

I claim:

1. An intelligent industry internet of things (IIoT) system using two-way channel artificial neural network (ANN), the IIoT system (100) being connected to at least a sensing device (200) and at least a motion device (300), comprising:
    wherein the IIoT system (100) includes at least a programmable logic controller (PLC) (1), at least a Cloud server (2) and at least a remote device (3);
    wherein the PLC (1) has at least an input output (I/O) module (11), at least a communication module (12), a perception database (13), a motion database (14), an edge computing module (15) and a first message queuing telemetry transport (MQTT) data module (16); the I/O module (11) and the communication module (12) are connected to the sensing device (200) and the motion device (300) respectively; the perception database (13) and the motion database (14) are connected to the I/O module (11) and the communication module (12) respectively; the edge computing module (15) is connected to the perception database (13) and the motion database (14) respectively; the first MQTT data module (16) is connected to the edge computing module (15), and connected to the Cloud server (2) via network (10);
    wherein the Cloud server (2) is connected to the PLC (1) via network (10), and at least has a MQTT agent (21), a Big Data module (22), a Human-Cloud visual database (23) and a Human-Cloud control database (24); the MQTT agent (21) is connected to the first MQTT data module (16) via network (10); the Big Data module (22) is connected to the MQTT agent (21); the Human-Cloud visual database (23) and the Human-Cloud control database (24) are connected to the MQTT agent (21) and the Big Data module (22) respectively, and connected to the remote device (3) via network (10);
    wherein the remote device (3) is connected to the Cloud server (2) via network (10), and it at least has a Human-Cloud visual interface program (31), a Human-Cloud control interface program (32) and a second MQTT data module (33); the Human-Cloud visual interface program (31) and the Human-Cloud control interface program (32) are connected to the second MQTT data module (33) respectively; the second MQTT data module (33) is connected to the MQTT agent (21) via network (10), and simultaneously connected to the Human-Cloud visual database (23) and the Human-Cloud control database (24) via the MQTT agent (21).

2. The intelligent industry internet of things (IIoT) system using two-way channel artificial neural network (ANN) defined in claim 1, wherein the edge computing module (15) includes an edge computing program (151) and an edge computing database (152); the edge computing program (151) is connected to the perception database (13) and the motion database (14) respectively; the edge computing database (152) is connected to the edge computing program (151) and the first MQTT data module (16) respectively;
    wherein the first MQTT data module (16) includes a first conversion program (161), a first MQTT database (162), a first subscription program (163) and a first issue program (164); the first conversion program (161) is connected to the edge computing database (152); the first MQTT database (162) is connected to the first conversion program (161); the first subscription program (163) is connected to the first MQTT database (162) and the MQTT agent (21) respectively; the first issue program (164) is connected to the first MQTT database (162) and the MQTT agent (21) respectively;
    wherein the Big Data module (22) includes a Big Data operation program (221) and a Big Data database (222); the Big Data operation program (221) is connected to the MQTT agent (21) and the Big Data database (222); the Big Data database (222) is connected to the Human-Cloud visual database (23) and the Human-Cloud control database (24) respectively;
    wherein the second MQTT data module (33) includes a second conversion program (331), a second MQTT database (332), a second subscription program (333) and a second issue program (334); the second conversion program (331) is connected to the Human-Cloud visual interface program (31) and the Human-Cloud control interface program respectively; the second MQTT database (332) is connected to the second conversion program (331), the second subscription program (333) and the second issue program (334) respectively; the second subscription program (333) is connected to the MQTT agent (21); the second issue program (334) is connected to the MQTT agent (21).

3. The intelligent industry internet of things (IIoT) system using two-way channel artificial neural network (ANN) defined in claim 2, the Cloud server (2) has at least one of machine learning module (25) and AI module (26) which can be connected to the Big Data module (22).

4. The intelligent industry internet of things (IIoT) system using two-way channel artificial neural network (ANN) defined in claim 3, wherein the machine learning module (25) includes a machine learning analysis operation program (251) and a machine learning database (252); the machine learning analysis operation program (251) is connected to the Big Data database (222); the machine learning database (252) is connected to the machine learning analysis operation program (251), the Human-Cloud visual database (23) and the Human-Cloud control database (24) respectively;

wherein the AI module (26) comprises an AI decision-making operation program (261) and an AI database (262); the AI decision-making operation program (261) is connected to the Big Data database (222); the AI database (262) is connected to the AI decision-making operation program (261), the Human-Cloud visual database (23) and the Human-Cloud control database (24).

5. The intelligent industry internet of things (IIoT) system using two-way channel artificial neural network (ANN) defined in claim 4, wherein when the Cloud server (2) has the machine learning module (25) and the AI module (26) simultaneously, the AI decision-making operation program (261) is connected to the machine learning database (252), and connected to the Big Data database (222) via the machine learning analysis operation program (251) connected to it.

6. The intelligent industry internet of things (IIoT) system using two-way channel artificial neural network (ANN) defined in claim 5, wherein the communication protocol applied among the PLC (1), the Cloud server (2) and the remote device (3) is MQTT communication protocol.

7. The intelligent industry internet of things (IIoT) system using two-way channel artificial neural network (ANN) defined in claim 6, wherein the remote device (3) is a pair of smart glasses.

* * * * *